United States Patent
Carpenter, Jr.

[19]

[11] Patent Number: 5,932,838
[45] Date of Patent: Aug. 3, 1999

[54] IONIZATION CLUSTER TREE HAVING TIERS OF SPLINE BALL IONIZERS

[75] Inventor: Roy Benson Carpenter, Jr., Boulder, Colo.

[73] Assignee: Lightning Eliminators & Consultants Inc., Boulder, Colo.

[21] Appl. No.: 08/959,971

[22] Filed: Oct. 29, 1997

Related U.S. Application Data

[63] Continuation of application No. 08/736,806, Oct. 25, 1996, abandoned.

[51] Int. Cl.$^6$ .................................................. H02G 13/00
[52] U.S. Cl. ............................................... 174/2; 361/220
[58] Field of Search .................................. 174/2, 3, 4 R, 174/4 C, 6, 7; 361/216, 217, 218, 220, 221, 222

[56] References Cited

U.S. PATENT DOCUMENTS

| | | | |
|---|---|---|---|
| 2,056 | 4/1841 | Strong | 174/3 |
| 120,251 | 10/1871 | Demorest | 403/340 |
| 162,828 | 5/1875 | Kleckner | 174/4 R |
| 361,520 | 4/1887 | Hill | 174/6 |
| 4,180,698 | 12/1979 | Carpenter, Jr. | 174/2 |
| 5,043,527 | 8/1991 | Carpenter, Jr. | 174/2 |
| 5,073,678 | 12/1991 | Carpenter, Jr. | 174/2 |

FOREIGN PATENT DOCUMENTS

| | | | |
|---|---|---|---|
| 262841 | of 1931 | Italy | 174/4 R |
| 284311 | 12/1934 | Italy | 174/4 R |
| 58878 | 5/1923 | Sweden | 174/3 |

*Primary Examiner*—Kristine L. Kincaid
*Assistant Examiner*—Kamand Cuneo
*Attorney, Agent, or Firm*—Rick Martin

[57] ABSTRACT

Ionization clusters have a plurality of ionization points which act to dissipate lightning charges into the air and prevent a lightning strike. A tree-like structure has a central support tower. One ionization cluster is mounted to the top of the tower. Successive arrays of second, third and N tiers of ionization clusters are mounted to the tower. The resultant tree-like structure forms a bell-shaped force field of equal voltage potential during a lightning storm. The force field dissipates a lightning strike.

3 Claims, 13 Drawing Sheets

IONIZATION CLUSTER TREE HAVING TIERS OF SPLINE BALL IONIZERS

This application is a continuation of application number 08/736,806 filed Oct. 25, 1996, now abandoned.

FIELD OF THE INVENTION

The present invention relates to a lightning strike prevention apparatus having a tree-shaped array of Spline Ball Ionizers (SBI's) or similar devices wherein each SBI comprises about 120 wires extending in all directions from a common meeting point.

BACKGROUND OF THE INVENTION

The inventor herein has engineered and implemented lightning prevention systems for over twenty years. U.S. Pat. No. 4,180,698 (1979) to Carpenter, Jr. teaches an ionizer structure rising above the earth's surface and providing a uniform field shape in combination with an endless ground collector structure having service wires to the ionizer structure. The ionizer structure in its preferred mode has a plurality of dissipater elements having a geometry calculable so as to form the lines of equal potential.

U.S. Pat. No. 5,043,527 (1991) to Carpenter, Jr. discloses a lightning Dissipation Array System(DAS) having an optimal array of ionization points on a grounded invented hemisphere array.

U.S. Pat. No. 5,073,678 (1991) to Carpenter, Jr. discloses a Spline Ball Terminal (SBT) which can act to dissipate a lightning charge or in failure mode to collect a lightning strike from all directions, even sideways. The SBT is an SBI having a base rod.

Refer to prior art FIGS. 1, 2. The thunderheads are electrically charged bodies suspended in an atmosphere that may be considered, at best, a poor conductor. During a storm situation the charge will continue to build up within the cloud until the field strength reaches a point where the insulation quality of the air gap is no longer effective and breakdown takes place. The specific breakdown point varies with atmospheric conditions. It is generally taken as 3 kilovolt per centimeter for negatively charged storm cells and 5 kilovolt per centimeter for positively charged cells. The charging action or charge separation within the storm cell usually leaves the base of the cloud with a strong negative charge. In about ten percent of the cases the opposite seems true. This resulting charge induces a similar charge of opposite potential into the earth as illustrated by FIG. 1. The charge center 20 is concentrated on the earth's surface 22 just under the cloud 24 and of the same size and shape as the cloud 24. As structures 26 intervene between the earth and cells they are likewise charged shorting out a portion of the separating air space 28. The ultimate result can be either a triggered strike because of the reduced air space or because it was high enough to start an upwardly moving leader.

The foremost objective of the invention is to reduce the electrostatic potential between the area or facility of concern and the passing cloud's cells to a level where the ongoing atmospherics induce no deleterious effects into the facilities of concern. Some of these effects include, but are not limited to: direct lightning strikes or transients induced thereinto, communications circuits, meteorology sensors, process control equipment, status sensors, power transmission and distribution lines, telephone circuits, switch gear substations, FM and AM radio stations, television, cable television, microwave and other sensitive power and electronic equipment. This invention also eliminates the bound charge phenomena associated with, for example, petrochemical storage and processing facilities.

The lightning strikes, or flashes, are created when a cloud potential exceeds the breakdown potential of the surrounding air. As a result, a step leader is formed and moves rapidly earthward meeting an upward moving leader a short way above the earth. The deleterious transients are created by either the rapid change in the electrostatic field created by these discharges or by the rapid movement of the earth charge from the point where it was induced into the earth to the point where the lightning strike was terminated. This invention eliminates or minimizes, and in many cases eliminates the root cause of these phenomena by significantly reducing and suppressing, respectively, the electrostatic field and the conducting the charge away from the area of concern.

The ionizer 50 forms an inverted hemisphere. The lines of force 52 form a bell curve.

There are situations where a tower having a hemispherical dome as shown in FIG. 2 is not practical. The reasons may include:

a) wind load;
b) interference with an antenna;
c) physical clearances; and
d) need for a concentration of ionization points in a small area.

The present invention provides an equivalent lightning prevention system without the need to erect an inverted hemispherical dome. The structure taught herein uses clusters of high-density ionizing balls known as Spline Ball Ionizers (SBI's) or similar devices. The SBI's are arranged geometrically into trees having a wide base and a narrow top. The resulting lines of equal potential formed around the new structure form approximately the same desired bell curve as shown in FIG. 2. FIG. 3 shows a Spline Ball 33. It is relatively low cost to manufacture and install. The SBI 33 comprises a stem and a ball 91. The ball 91 is composed of multiple branches 92. Branches 92 may fold downward around stem 90 for ease of packaging and installation. Ball 91 and stem 90 are electrically conductive, preferably made of copper. The diameter w of ball 91 ranges from 24 to over 60 inches varying with the width of the tower it protects.

SUMMARY OF THE INVENTION

The primary object of the present invention is to provide an ionization structure comprised of a tree-shaped array of ionization clusters functioning to provide a bell-shaped field of force during operation in a storm.

Other objects of this invention will appear from the following description and appended claims, reference being made to the accompanying drawings forming a part of this specification wherein like reference characters designate corresponding parts in the several views.

The present invention describes a tree-like structure having a central support tower. On top of the tower is an ionizing cluster, preferably an SBI as described above. Under the top SBI is a second tier of SBI's. The density of the second tier is selected for the prevention density of ionization points required. That second tier density could vary from one to six SBI's. Third fourth and successive tiers each extend further outward form the tower to from the basic shape of a pine tree. In operation during a storm the SBI's ionization points form a bell-shaped curve of lines of equal voltage potential over the tower. These lines protect the area below from a lightning strike.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DESCRIPTION OF THE PREFERRED EMBODIMENT

Figure 5:
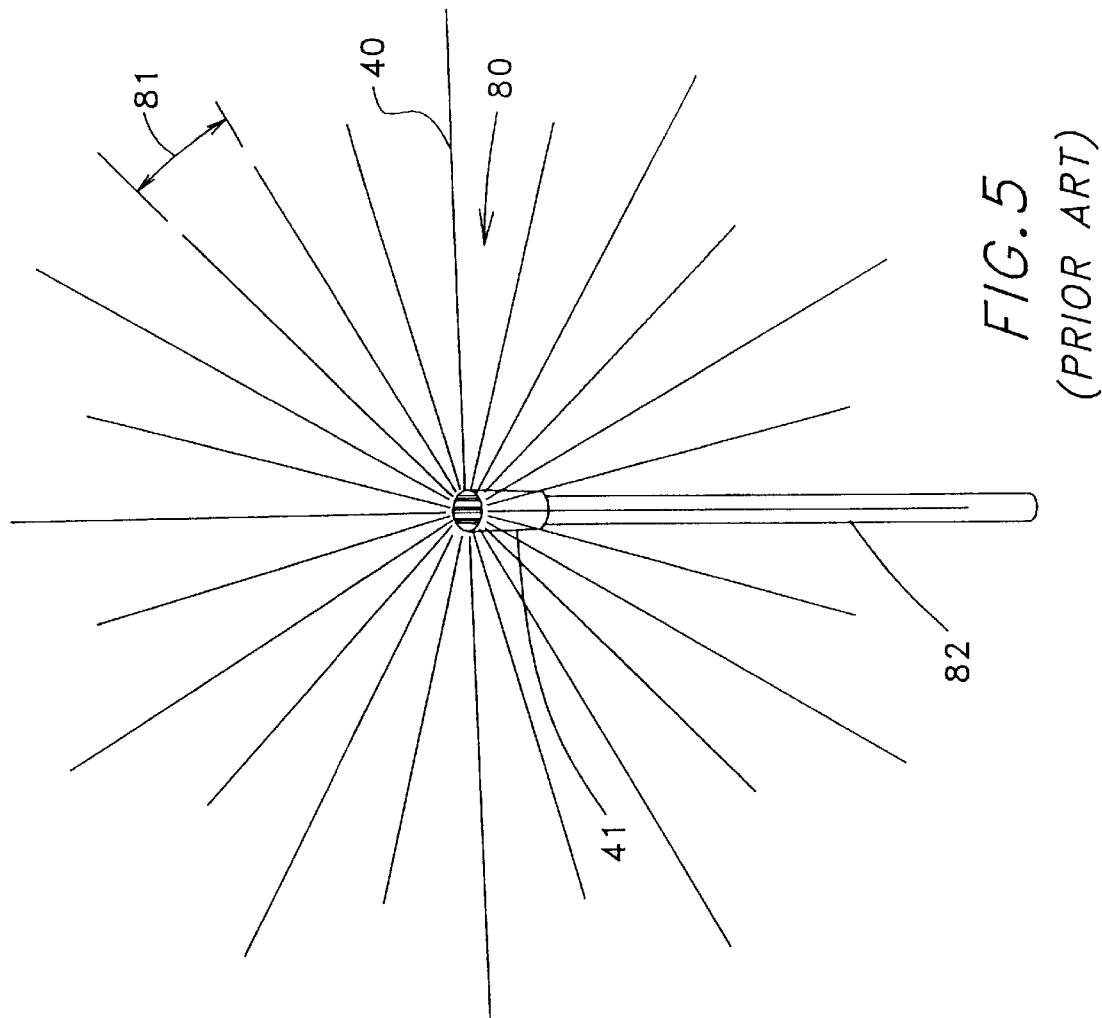
FIG. 5 (prior art) is a top perspective view of an SBI in an operational state.
Figure 4:
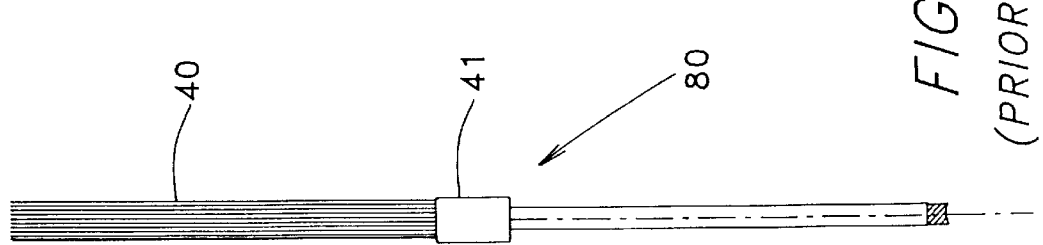
FIG. 4 (prior art) is a side plan view of an SBI in a folded state.

Referring first to FIGS. 4, 5 the Spline Ball Ionizer (SBI) 80 is shown. The SBI has a number of splines 40 centrally affixed at point 41. The ideal number of splines is one hundred five (105). Each spline must be at least 1/10 inch in diameter or greater in order to withstand the environmental stresses of the electric power of an average stroke. A spline is oriented at least every 5 degrees (as shown by angle 81) and is azimuth for the full 360 degrees and a full 120 degrees in elevation. As a result, there is not a direction from which a leader can approach that would not have a collective point oriented directly toward it with many nearby backup points. During a failure mode of a lightning strike, the percent collected approaches 100 percent from all angles because each spline 40 offers a near zero angle of attack on the lightning stroke.

Each spline 20 is at least 12 inches long. The shaft 82 is at least 10 inches long.

The present invention in the preferred embodiment uses the SBI as the ionization cluster. However, alternate embodiments (not shown) of ionization clusters include wire plumes, brushes, and barbed wire configurations.

The present invention teaches the new, useful and non-obvious arrays of ionization clusters to form tree-shaped lightning prevention systems.

Figure 6:
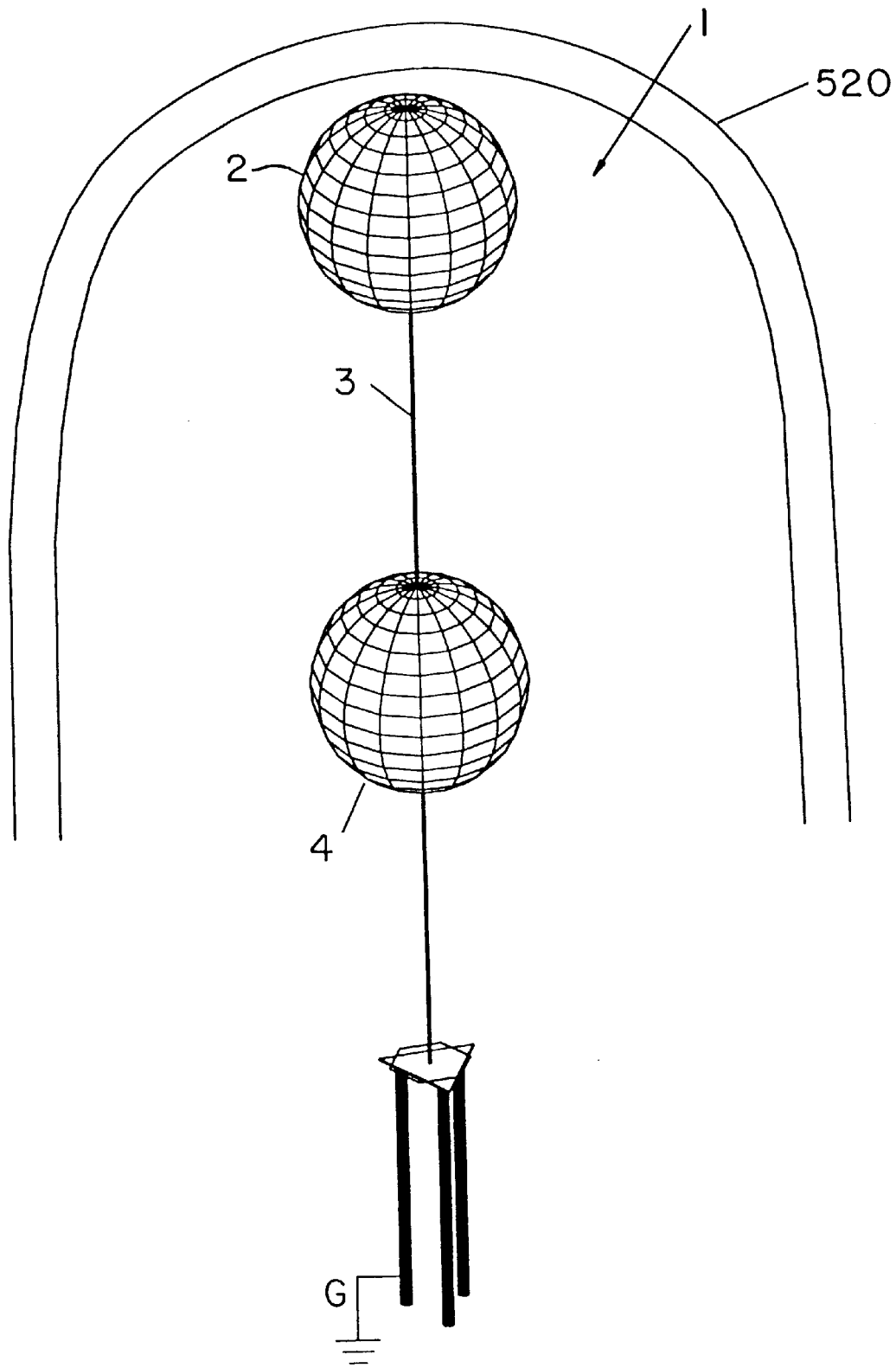
FIG. 6 is a perspective view of a two-cluster tree.

Referring next to FIG. 6, the smallest embodiment of an ionization tree 1 is shown to have a tower 3, a top ionization cluster 2, and a single second-tier ionization cluster 4 (designated a ionization array). Preferably, the ionization clusters are SBI's with each having over 100 ionization points. In a storm, the bell-shaped force field 520 offers lightning protection to objects beneath. All towers herein are grounded as shown at G.

Figure 7:
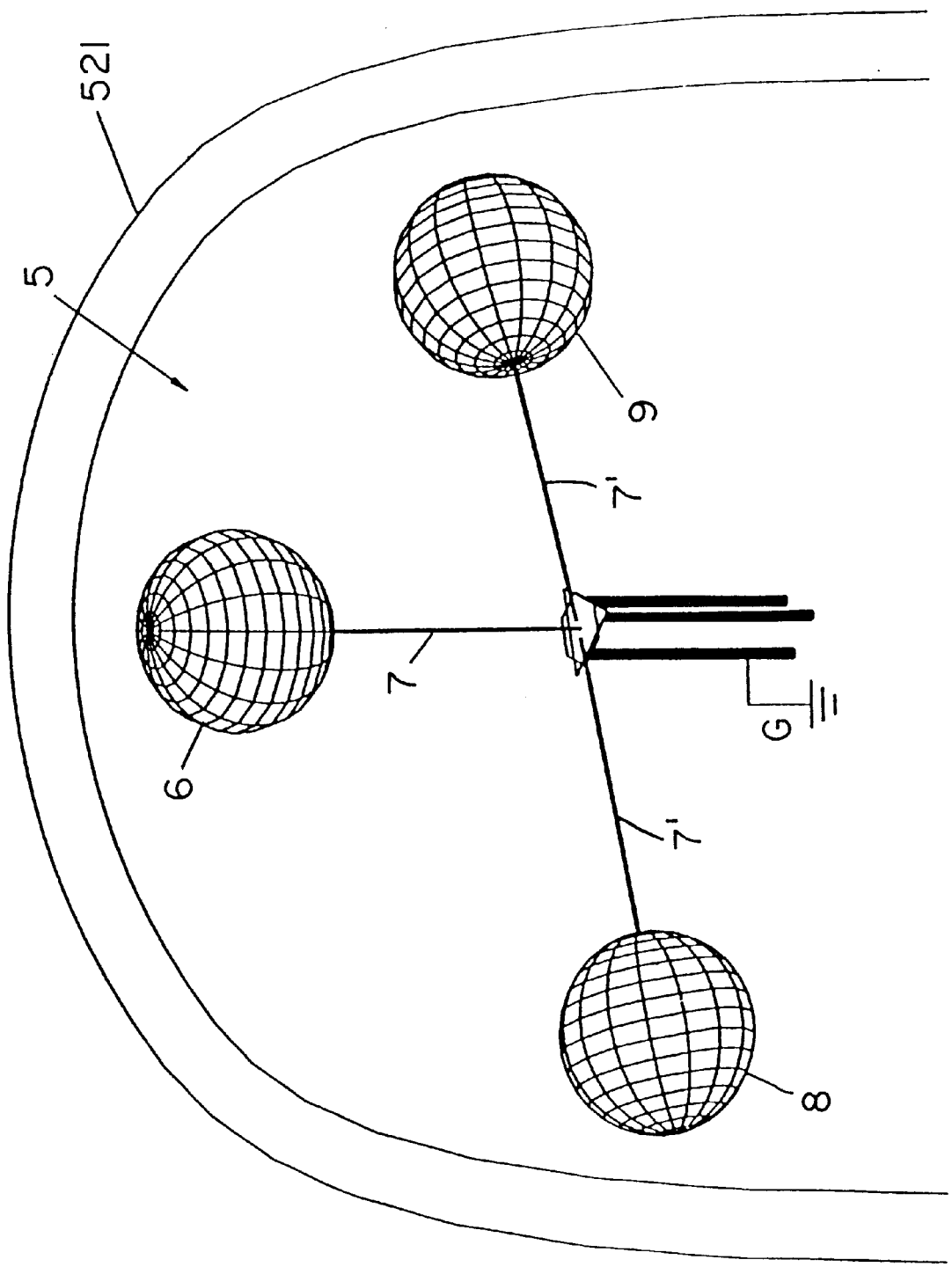
FIG. 7 is a perspective view of a two-tier tree having two clusters in its second tier array.

Referring next to FIG. 7, a small embodiment of an ionization tree 5 is shown to have a tower 7, a top ionization cluster 6, and a second tier of ionization clusters 8, 9 mounted on support shafts 7' which emanate from the central tower 7 at a 90-degree angle. Force field 522 offers lightning protection to objects beneath.

Figure 8:
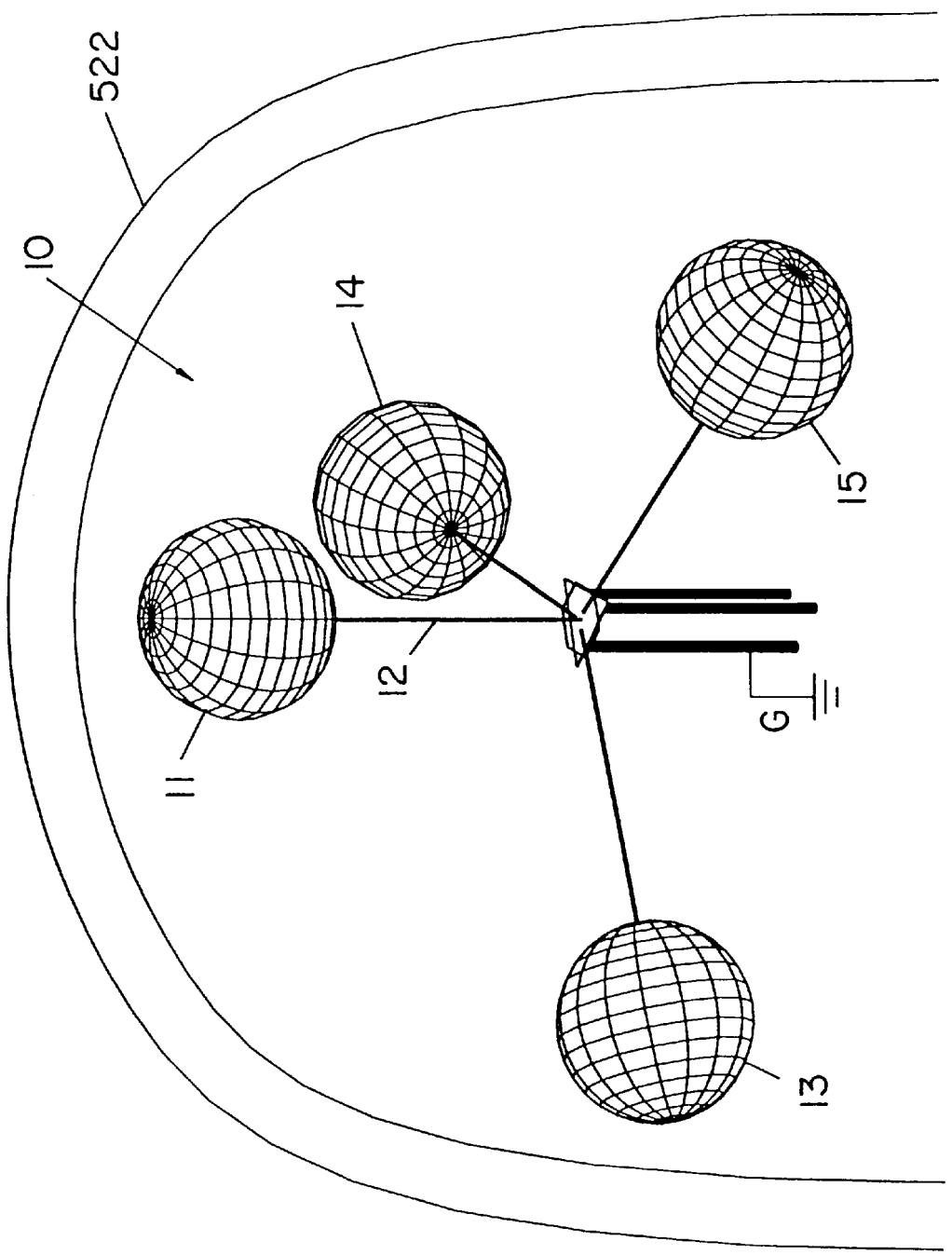
FIG. 8 is a perspective view of two-tier tree having three clusters in its second tier array.

Referring next to FIG. 8, ionization tree 10 has a top ionization cluster 11, a tower 12 and a second tier of ionization clusters 13, 14, 15. Force field 522 offers lightning protection to objects beneath.

Figure 9:
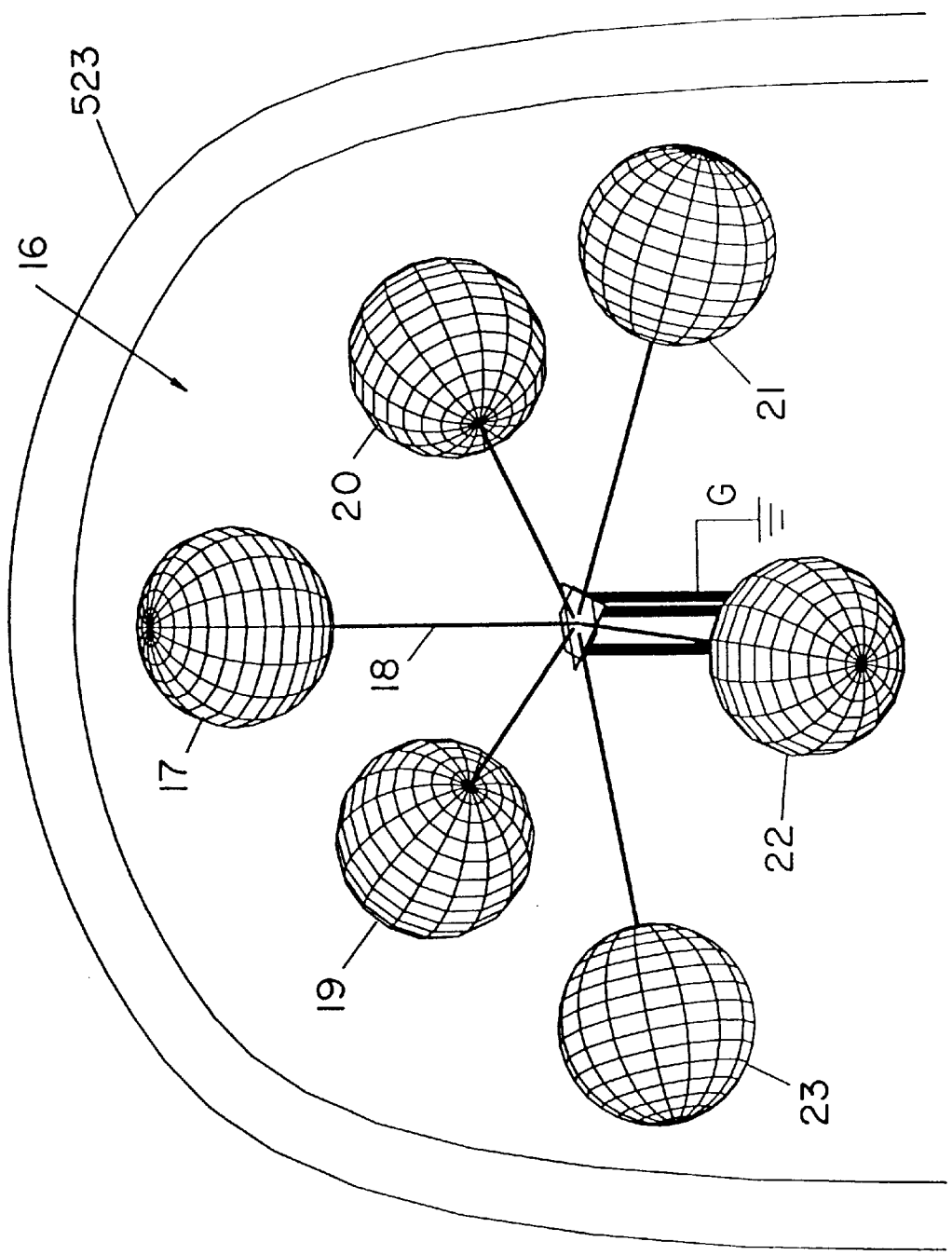
FIG. 9 is a perspective view of a two-tier tree having five clusters in its second tier array.

Referring next to FIG. 9, ionization Tree 16 has a top ionization cluster 17, a tower 18 and a second tier of ionization clusters 19, 20, 21, 22, 23. Force field 523 offers lightning protection to objects beneath.

Figure 10:
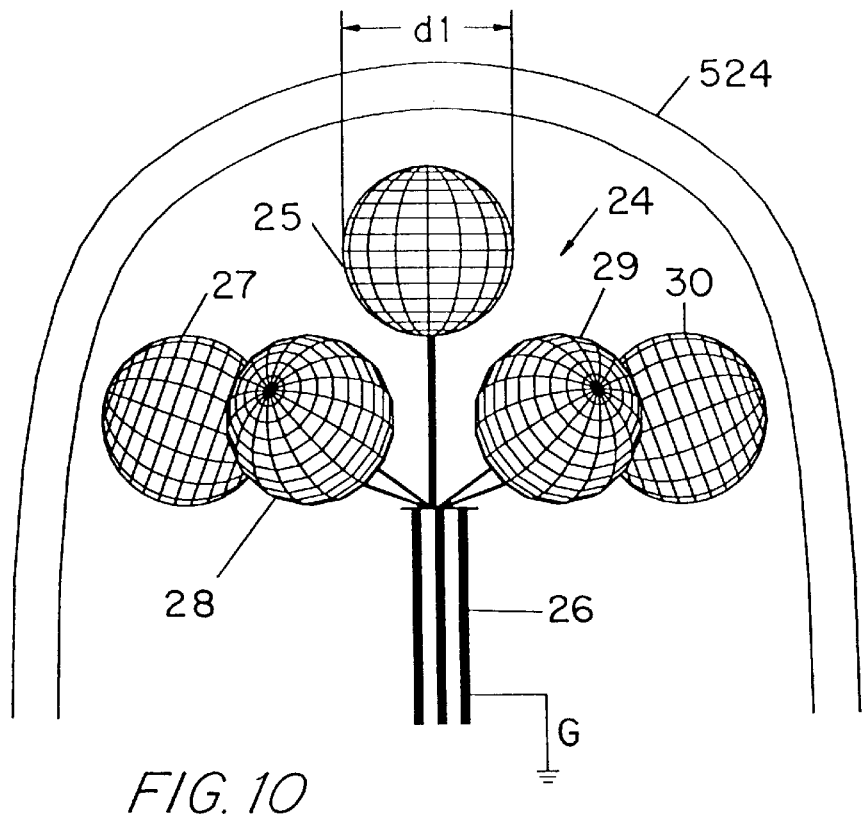
FIG. 10 is a side plan view of a two-tier tree having six clusters in its second tier array. This is the preferred embodiment.
Figure 11:
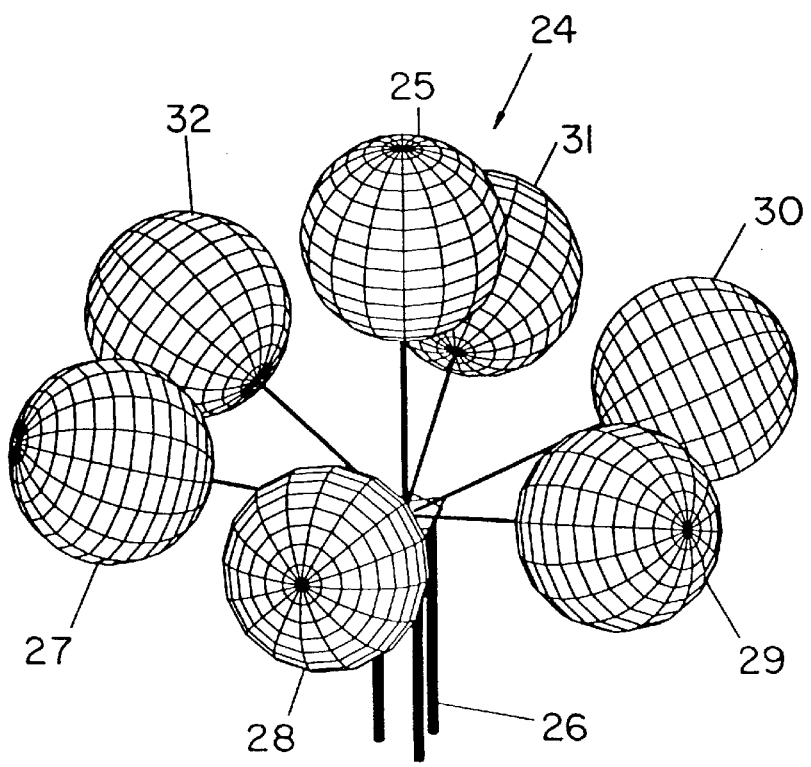
FIG. 11 is a top perspective view of the preferred embodiment shown in FIG. 10.
Figure 12:
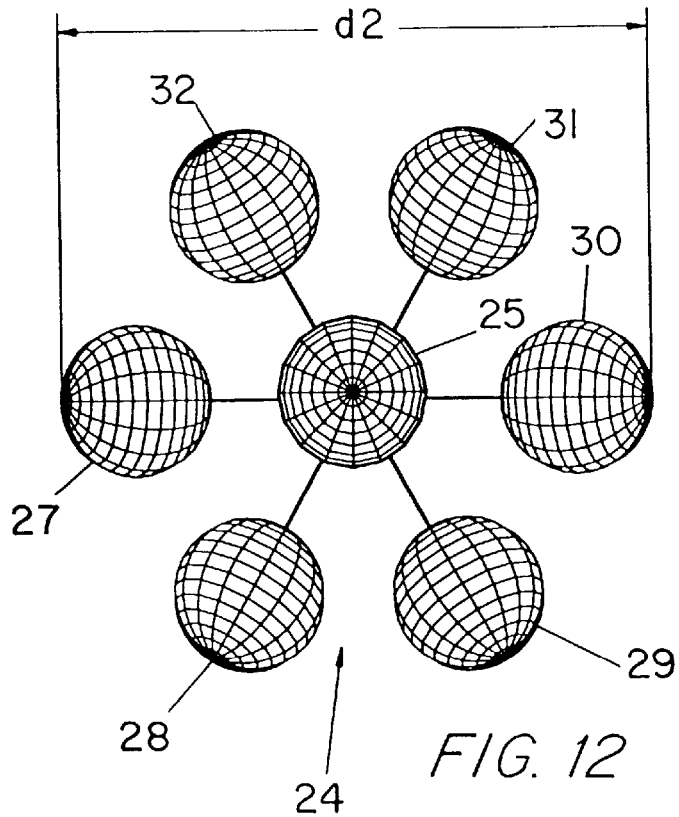
FIG. 12 is a top plan view of the preferred embodiment shown in FIG. 10.

Referring next to FIGS. 10, 11, 12, an ionization tree 24 has a top ionization cluster 25, a tower 26 and a second tier of ionization clusters 27, 28, 29, 30, 31, 32. Force field 524 offers lightning protection to objects beneath. When SBI's are used as ionization clusters 700 ionization points are provided. Diameter $d_1$ is between 24 and 60 inches and diameter $d_2$ is between 6' and 12'.

Figure 13:
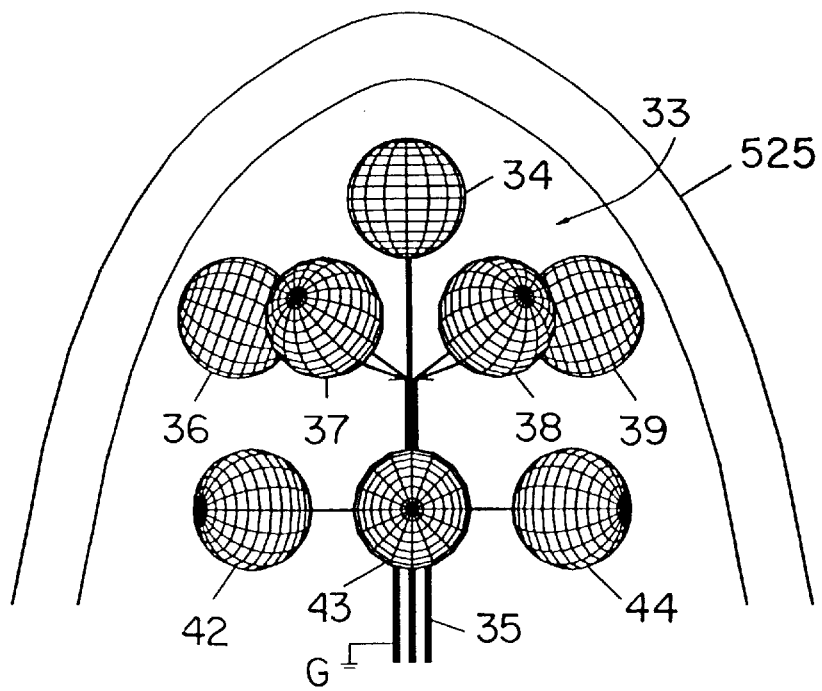
FIG. 13 is a side plan view of a three-tier tree.
Figure 15:
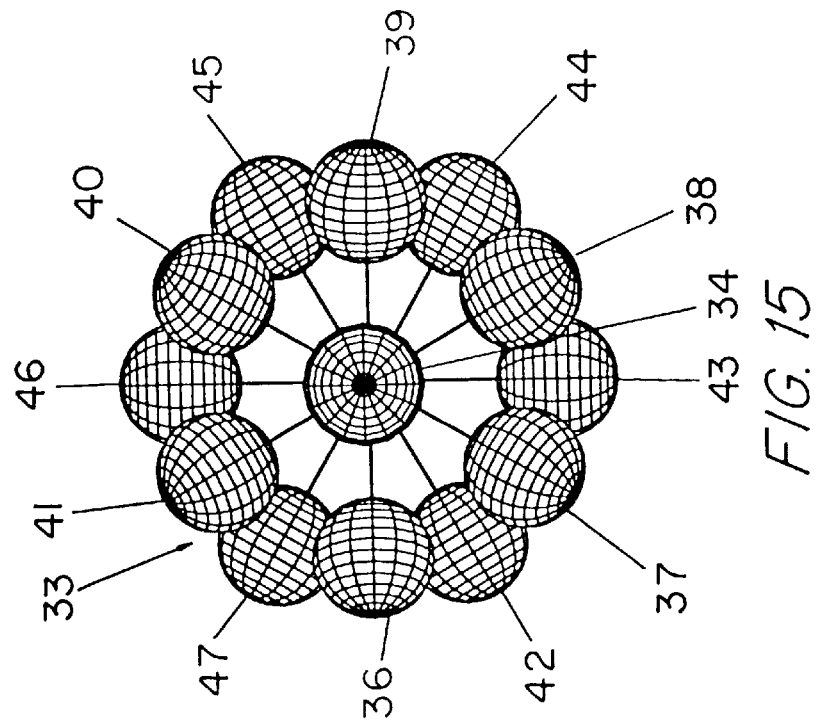
FIG. 15 is a top plan view of the embodiment shown in FIG. 13.
Figure 14:
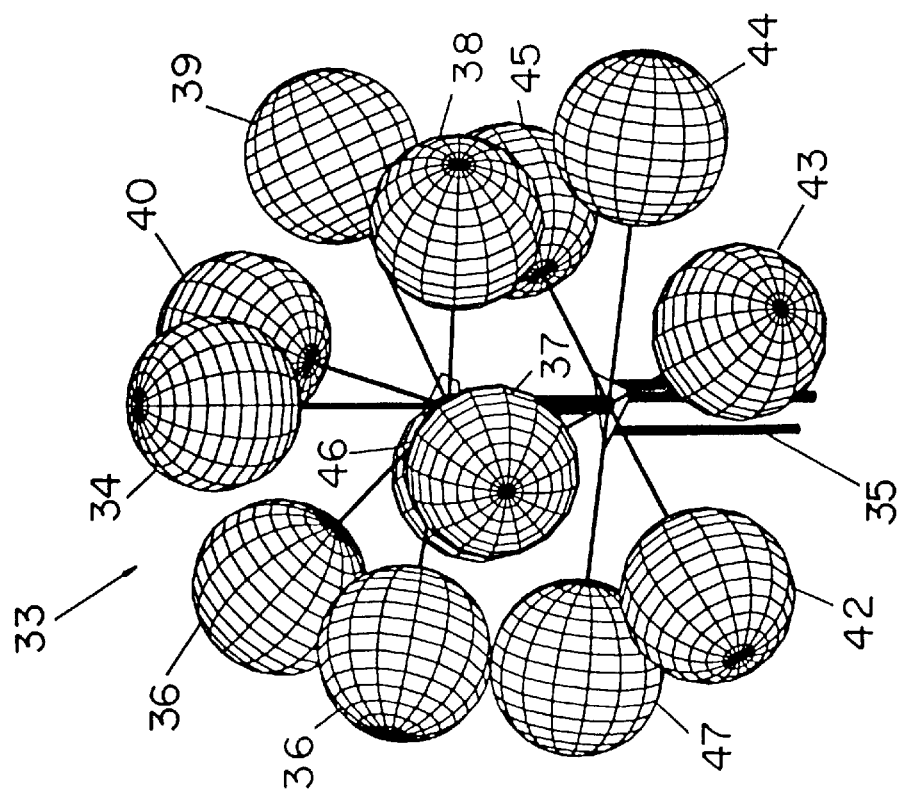
FIG. 14 is a top perspective view of the embodiment shown in FIG. 13.
Figure 17:
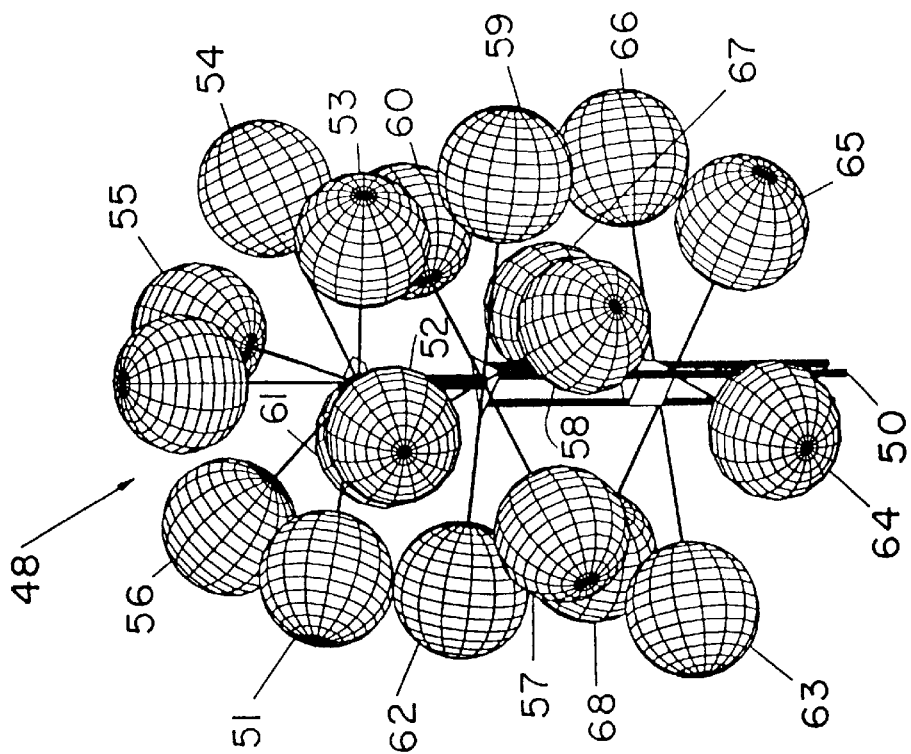
FIG. 17 is a top perspective view of the embodiment shown in FIG. 16.
Figure 16:
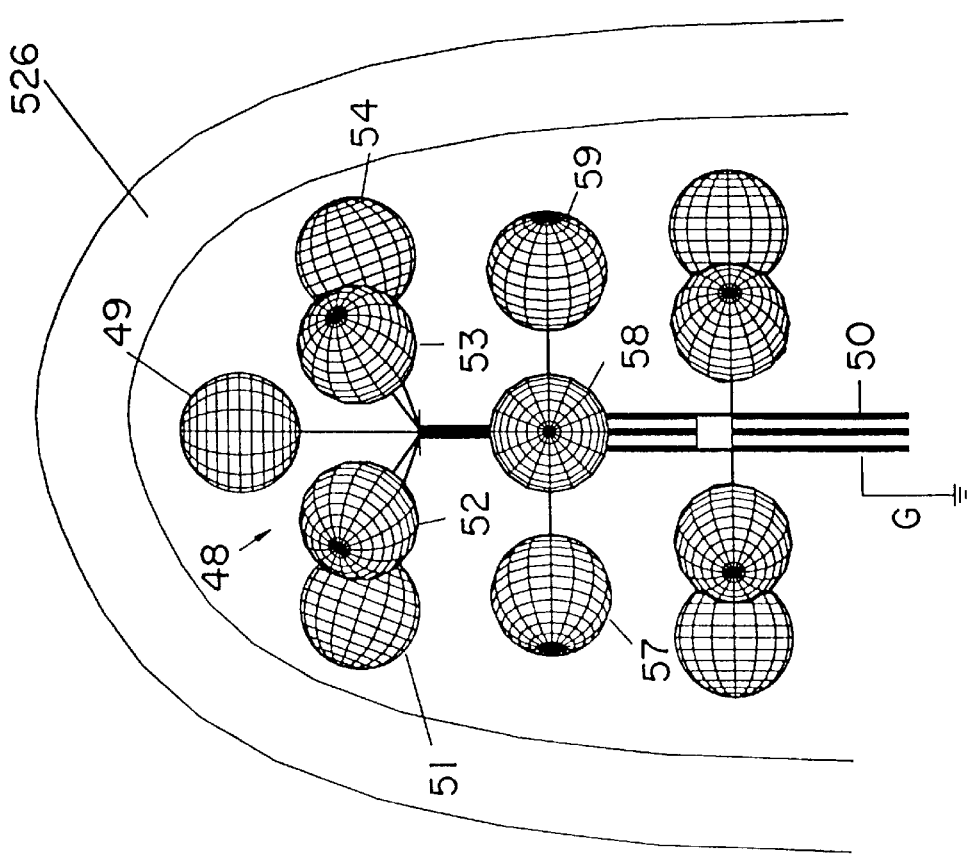
FIG. 16 is a side plan view of a four-tier embodiment.
Figure 18:
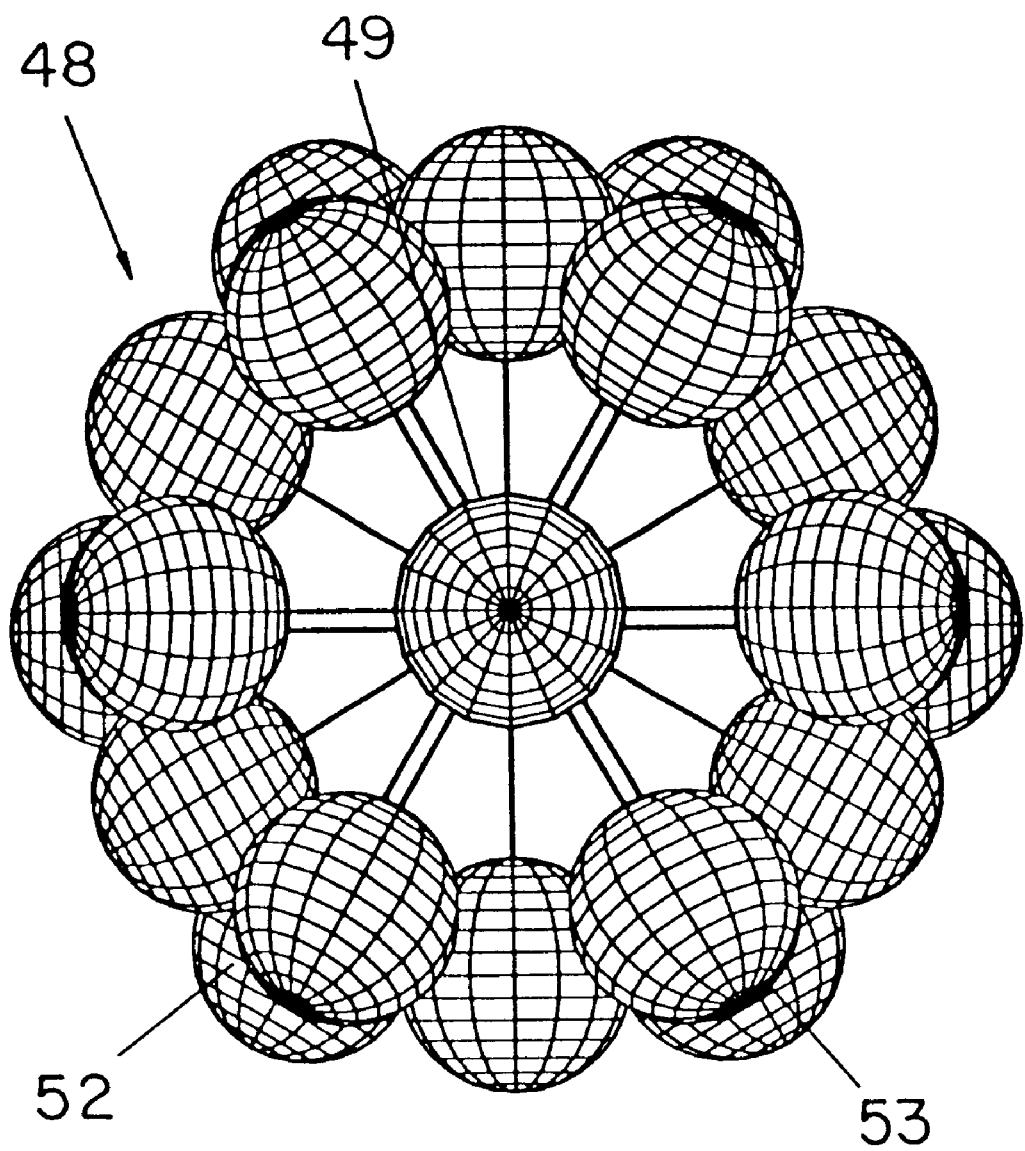
FIG. 18 is a tip plan view of the embodiment shown in FIG. 16.

Referring next to FIGS. 13, 14, 15, an ionization tree 33 has a top ionization cluster 34, a tower 35, a second tier of ionization clusters 36, 37, 38, 38, 40, 41, and a third tier of ionization clusters 42, 43, 44, 45, 46, 47, Force field 525 offers lightning protection to objects beneath.

Figure 1:
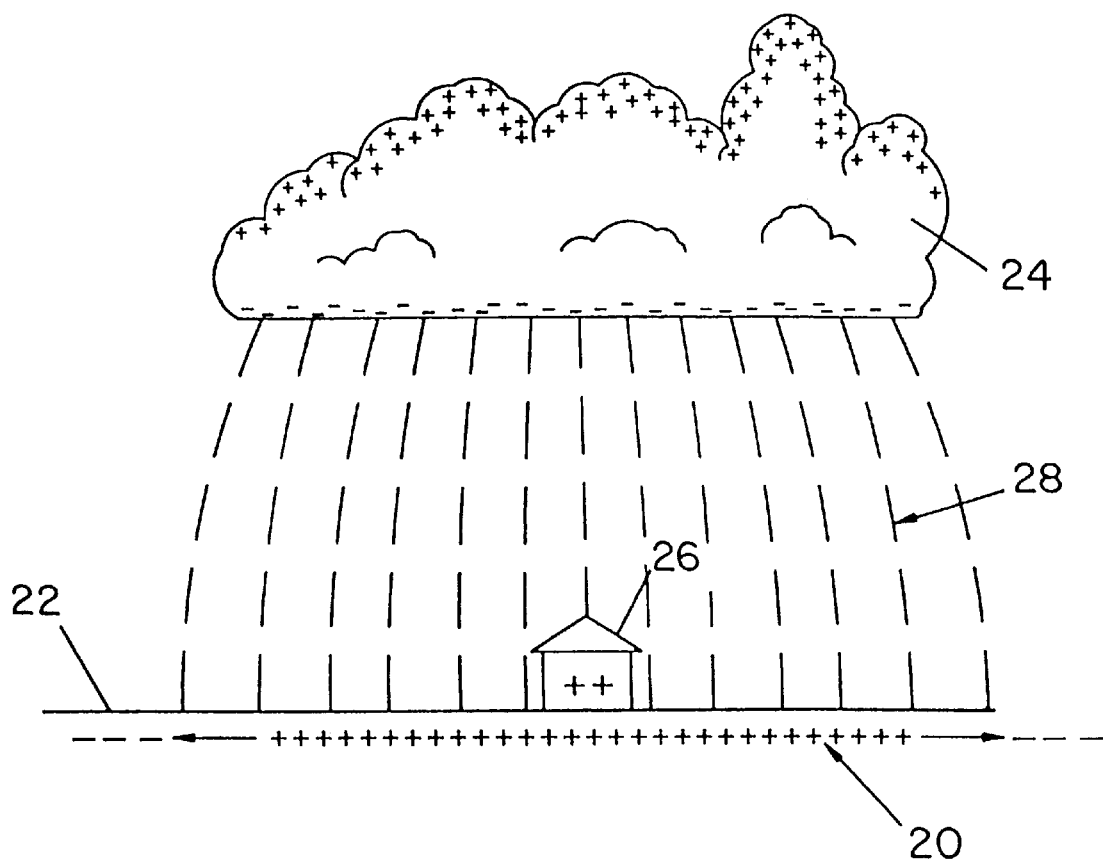
FIG. 1 (prior art) is a schematic view in front elevation of a charge cloud influence on facilities located on the surface of the earth, indicating possible and typical polarities of the prevailing electric charges.
Figure 3:
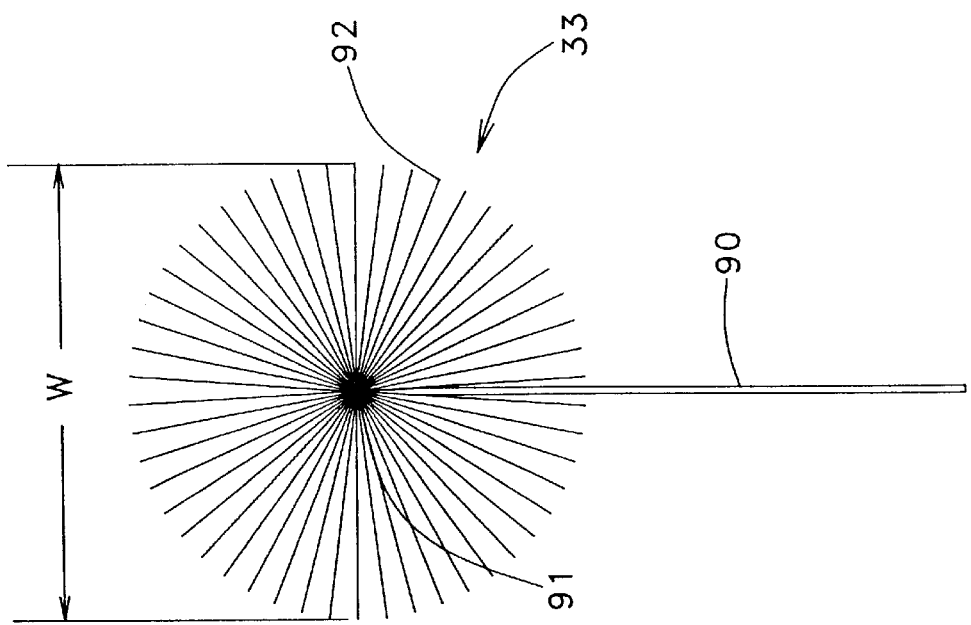
FIG. 3 (prior art) is a front plan view of a Spline Ball Ionizer (SBI).
Figure 2:
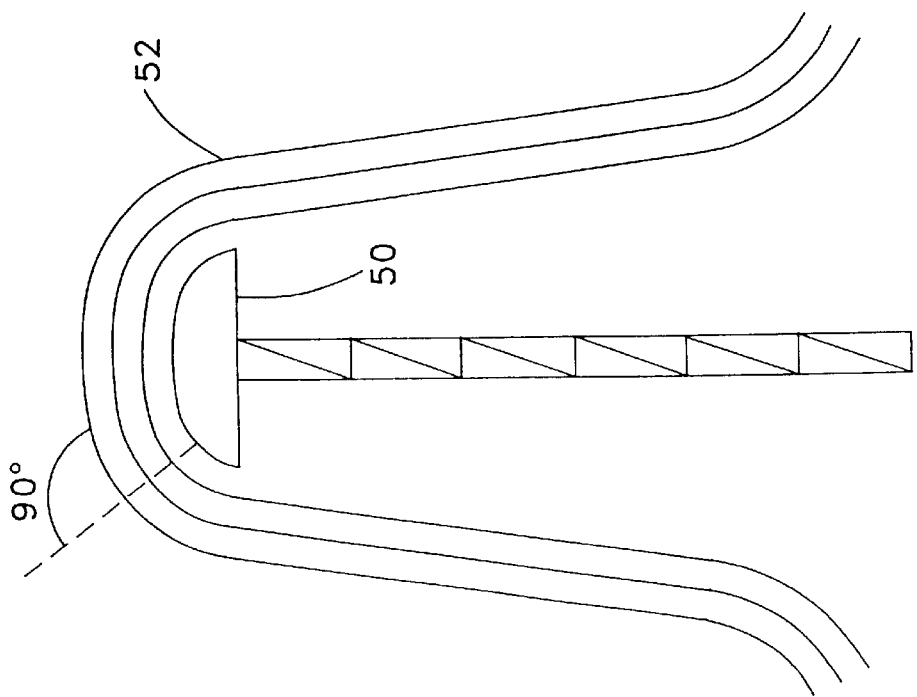
FIG. 2 (prior art) is a schematic view in front elevation of a hemispherically-shaped ionizer and its operational characteristics.

Referring next to FIGS, 16, 17, 18, an ionization tree has a top ionization cluster 49, a tower 50, a second tier of ionization clusters 51, 52, 53, 54, 55, 56, a third tier of ionization clusters 57, 58, 59, 60, 61, 62, and a fourth tier of ionization clusters 63, 64, 65, 66, 67, 68. Force field 526 offers lightning protection to objects beneath. This embodiment and the embodiment of FIGS. 13–15 actually exceed the ionization capability of a traditional hemispherical array shown in FIG. 2. These embodiments of FIGS. 13–19 also deal with lightning leaders coming in toward the side of the tower (in failure mode when a strike occurs) better than the hemispherical array because the sideways pointing ionization points attract the strike into the grounded tower rather than letting the strike hit the protected objects beneath.

Other embodiments (not shown) allow N number of tiers to be mounted on the central support tower.

Figure 19:
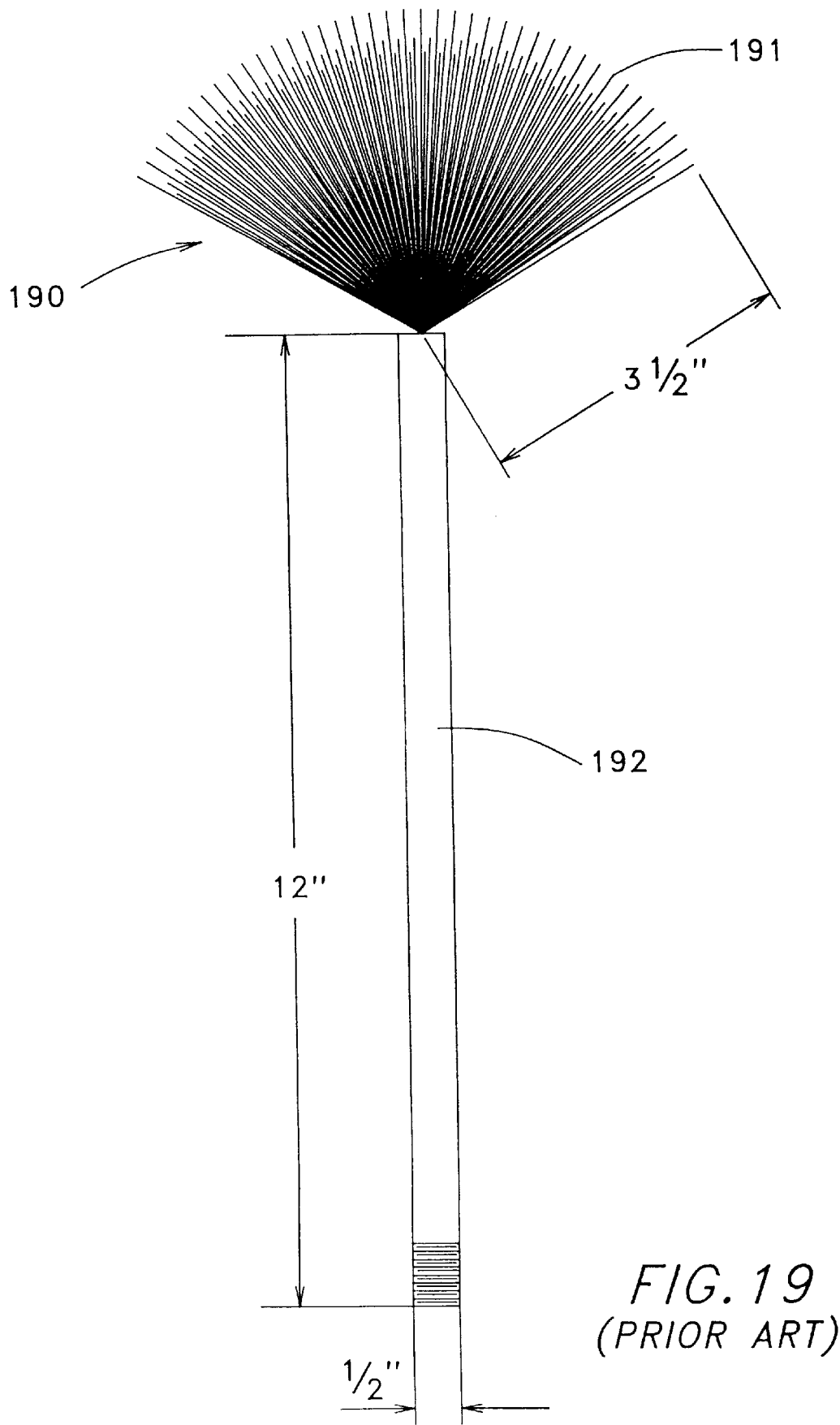
FIG. 19 (prior art) is a side plan view of a known commercial ionizer plume.

FIG. 19 shows a known plume-type ionizer 190 having plumes 191 and base 192 which could be used as the ionizer cluster for the ionization trees described above.

Although the present invention has been described with reference to preferred embodiments, numerous modifications and variations can be made and still the result will come within the scope of the invention. No limitation with respect to the specific embodiments disclosed herein is intended or should be inferred.

I claim:

1. An ionization tree comprising: a central support tower having a ground and a height of at least 40 inches; a top ionization cluster mounted on top of the central support tower; said top ionization cluster consisting of a Spline Ball Ionizer having a plurality of splines centrally affixed at a common point, wherein each of said splines is at least 12 inches long, and wherein each of said splines is oriented at least every 5 degrees and extends in the azimuthal direction for a full 360 degrees and a full 120 degrees in elevation; and a second tier ionization cluster array consisting of a plurality of Spline Ball Ionizers mounted on top of the central support tower below the top ionization cluster spatially separated from the central support tower by a plurality of support shafts forming a 90-degree angle with the central support tower functioning to create a bell-shaped force field of equal potential in a lightning storm.

2. The ionization tree of claim 1 further comprising a third tier ionization cluster array having a plurality of ionization clusters consisting of Spline Ball Ionizers.

3. The ionization tree of claim 2 further comprising a fourth tier ionization cluster array having a plurality of ionization clusters consisting of Spline Ball Ionizers.

* * * * *